March 14, 1939.　　　H. CAMINEZ　　　2,150,875

METHOD OF CONNECTING LIGHT METAL ALLOY PARTS

Filed July 18, 1936　　　4 Sheets-Sheet 1

INVENTOR.
Harold Caminez
BY Williams, Rich & Morse
ATTORNEYS

March 14, 1939.	H. CAMINEZ	2,150,875
METHOD OF CONNECTING LIGHT METAL ALLOY PARTS
Filed July 18, 1936	4 Sheets-Sheet 2

INVENTOR.
Harold Caminez
BY Williams, Rich + Morse
ATTORNEYS

March 14, 1939.  H. CAMINEZ  2,150,875
METHOD OF CONNECTING LIGHT METAL ALLOY PARTS
Filed July 18, 1936  4 Sheets-Sheet 3

INVENTOR.
BY Harold Caminez
Williams, Rich + Morse
ATTORNEYS

Patented Mar. 14, 1939

2,150,875

UNITED STATES PATENT OFFICE 2,150,875

METHOD OF CONNECTING LIGHT METAL ALLOY PARTS

Harold Caminez, Brooklyn, N. Y., assignor to Aircraft Screw Products Company, Inc., Long Island City, N. Y., a corporation of New York Application July 18, 1936, Serial No. 91,263

4 Claims. (Cl. 29—148)

Notwithstanding the present day extensive use of light weight metal alloys such as aluminum and magnesium in industry, particularly by the manufacturers of aircraft and automotive devices, no satisfactory form of screw connections has been developed and the object of my present invention is to produce a threaded connection which will not become loosened and will not freeze or bind under pressure so that when once fastened together may at a later time be disconnected. My invention also has as one of its objects to provide for the differences between the physical properties of light metal alloys and the attached studs or bolts of other materials such as strength, hardness, modulus of elasticity and differences in coefficients of expansion.

More specifically stated, my invention may be set forth as providing between a light metal alloy, and the cooperating part of a hard polished screw member of adequate strength to form a screw thread with correctly proportioned bearing areas so designed that the differences in temperature expansion characteristics will not cause additional strains in the mating members. Stated in another way my invention will produce a stronger screw or stud connection than can be obtained with the old form of screw thread and will adequately support the separate members or studs against side loads as well as tensile loads so that these parts are better enabled to act as dowel members and withstand sheer strains.

To these and other ends my invention consists in certain further improvements all as will be further described in the following specification, the novel features thereof being particularly pointed out in the appended claims.

In the drawings.

Similar reference numerals in the several figures indicate similar parts.

Figure 2:
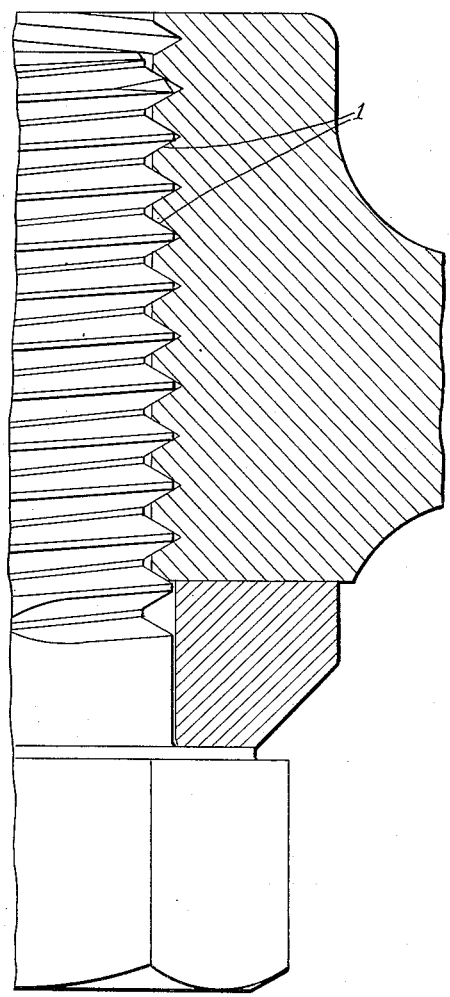
Figs. 1 and 2 are cross-sectional views of a standard threaded socket and its stud, the first showing a screw and boss assembly at normal temperature and the second the condition after the assembly has been heated and showing the overstressing of the threads.
Figure 1:
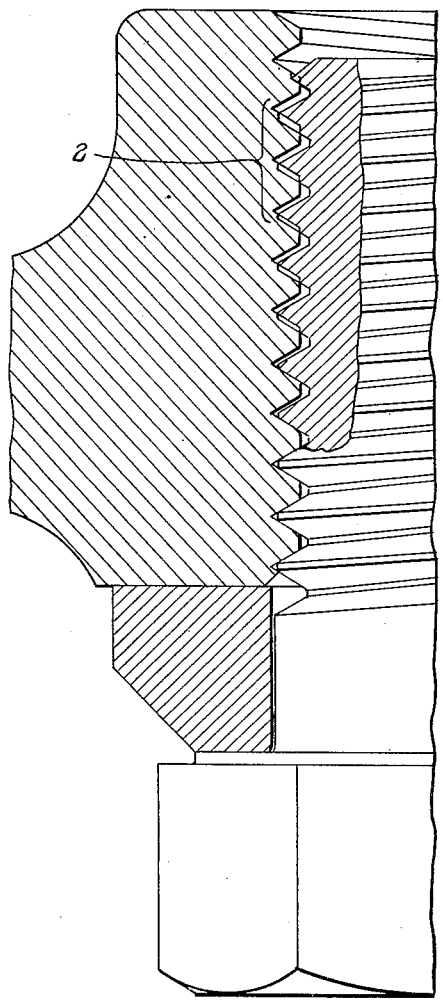

When threaded mating members of dissimilar metals, such as a steel screw in an aluminum alloy boss are used differences in expansion due to temperature changes cause high stresses in the former conventional type of threads. In uniting the parts the threads 1, as shown in Fig. 1, are put under an initial tension to hold the assembly tightly together. This is a service requirement and such tension is a continuous one which is supposed to exist irrespective of temperature changes. What then occurs when the parts are heated, as happens in engine parts is shown in Fig. 2. As the temperature increases there is a corresponding increase in the expansion of the parts, as indicated at 2. The difference in expansion of aluminum and steel is about .002 inch per inch in length for a temperature rise of 300° F. Hence, if a steel stud is held to the aluminum it would have to be stressed .001 inch per inch of length, subjecting it to a stress of 30,000 pounds per square inch. Consequently the load and stress at the joint between these two different materials depends upon the relative cross-sectional area of the steel to the area of the joint. The diameter and pitch of the internal thread in the aluminum become greater than the diameter and pitch of the external thread on the steel stud resulting in a tendency to stretch the screw elastically with a corresponding compression effect in the boss. Now considering the ordinary type of V thread, it will be appreciated that the pitch of both the internal and external threads on the united parts must be identical if they are to mate without distortion and that when temperature changes occur if there is to be no over-stressing, resulting in permanent distortion in the softer aluminum thread, there must be a provision made to accomplish the mutual and equal compression and expansion of the parts. With the ½"-13 standard coarse U. S. thread, shown in Figs. 1 and 2, it is calculated that the compressive stress on the face of the aluminum threads at the inner end or bottom of the boss is 30,000 pounds per square inch for a temperature rise of 130° F. assuming that the steel stud is elongated elastically an amount equal to 50% of the temperature strain.

Within the elastic limit of the aluminum the stress in the inner end screw threads is proportional to the temperature rise. When a temperature is reached where the elastic limit of the aluminum alloy material is exceeded permanent distortion of this thread results. This distortion of the thread materially affects its load-carrying capacity because it is subjected to alternate heating and cooling and the load is required to be carried at both low and high temperature conditions. As before mentioned, the parts are united under an initial tension which is continuous, hence when the temperature changes are sufficiently high repeated changes will cause successive permanent distortions which beginning with the innermost threads will work outwardly until the outermost threads will be found to be distorted with a consequent loosening of the stud in the boss.

Figure 5:
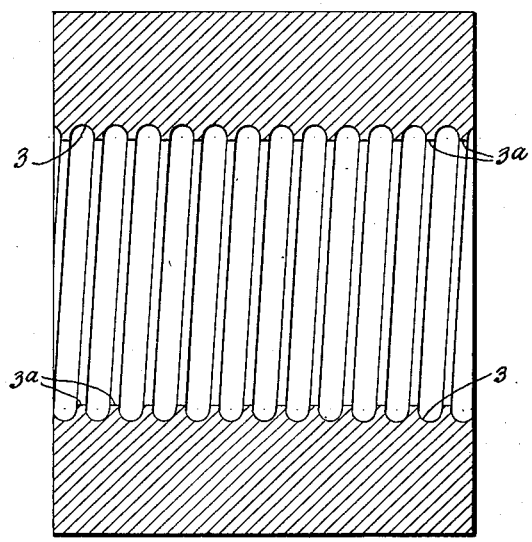
Fig. 5 is a detail cross section showing the interior groove provided in a boss preparatory to receiving the thread member proper.
Figure 6:
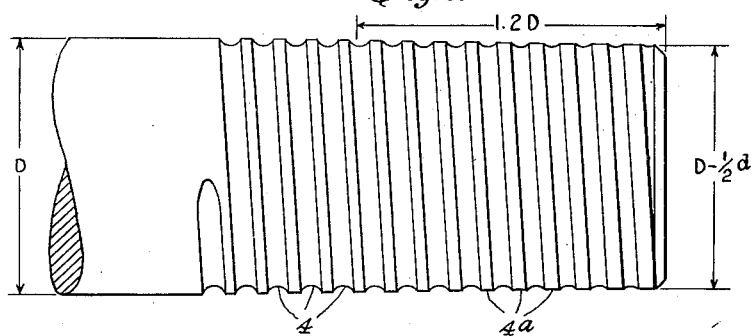
Fig. 6 is a side elevation of a steel stud showing the manner in which it is grooved and tapered.
Figure 7:
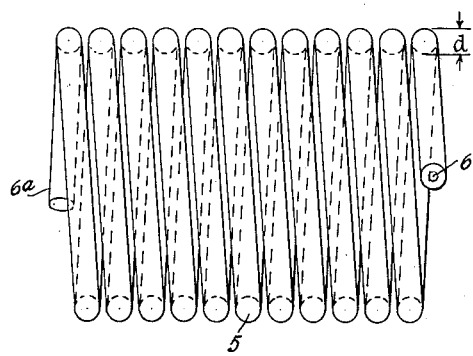
Fig. 7 is a side elevation of the thread element per se.
Figure 8:
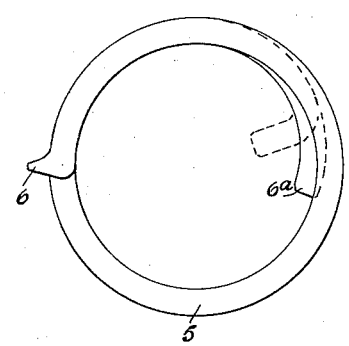
Fig. 8 is an end view of the coil.

In carrying out my invention, I provide the circular opening in the boss or aluminum part which is to receive the thread with a helical groove 3 as shown in Fig. 5. The adjacent convolutions of the groove are separated or spaced somewhat as indicated at 3ª to provide lands the width of which may vary in accordance with the pitch and diameter of the thread. A similar or matching helix is cut in the cooperating stud as shown in Fig. 6 where the grooves are indicated by 4 and the lands corresponding to the apices of the usual threads are indicated by 4ª. These grooves are segmental, the diameter of the circle which the grooves represent being that of the connecting member 5 of the spring wire which is coiled as shown in Fig. 8 and forms the connecting element between the mated members. The depth of the groove 3 in the nut or boss is deeper than that on the stud so that a greater portion of each convolution of the wire is embedded in the internally-threaded member since the material of the boss of an aluminum casting, is generally the softer and weaker part and a greater contacting surface or bearing area therein proves advantageous. Likewise since any groove cut in the bolt or stud lessens its cross sectional area it is advantageous to make this as shallow as possible yet at the same time afford sufficient shoulder portions to engage the connecting member 5 to give a firm hold thereon. In practice, I make the depth of groove 3 approximately ⅝ of the diameter of the cross section of the wire 5 and of a diameter from 1% to 3% less than that of the wire coil so that the latter is held therein by its spring tension.

Figure 4:
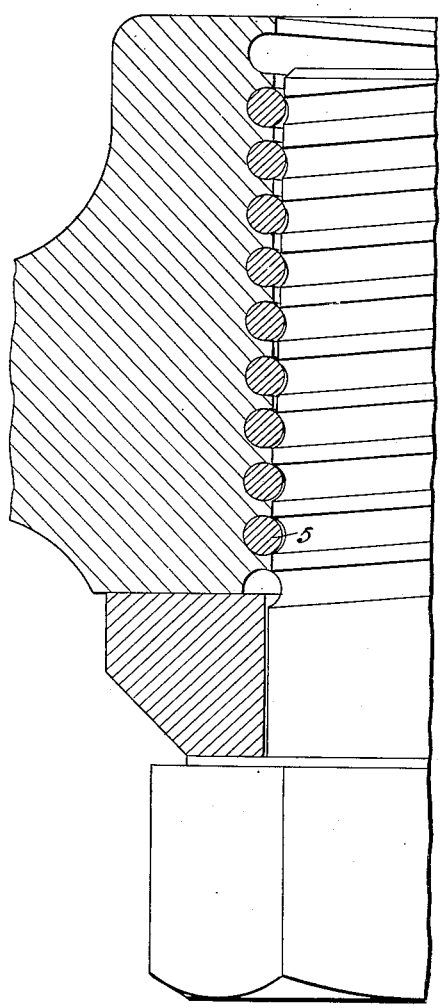
Figs. 3 and 4 are similar views respectively of a stud and boss provided with my improved form of thread, the latter showing the manner in which the stresses are compensated by the sliding action between the cooperating parts.
Figure 3:
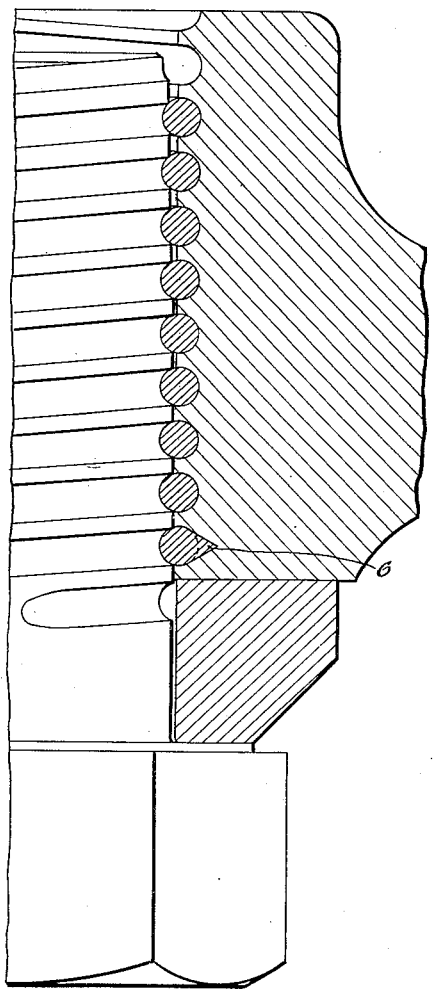

To eliminate strains in the convolutions in the stud, due to temperature changes, I form the stud in a particular manner so that the contact surface between it and the spring thread wire varies from turn to turn as will be seen in Fig. 3. This may be accomplished by first tapering the stud, and then cutting the groove of proper depth at each point throughout its length as shown in Fig. 6 or the groove may be cut the same depth throughout and the stud then tapered which operation lessens the depth of each succeeding groove. This tapering of the stud extends for a distance about equal to 1.2 times its normal diameter, the taper varying from the normal diameter D to a diameter at its extremity equal to $D - 1/2^d$, where $d$ equals the diameter of the spring wire. This tapering is such that lines drawn tangent to the round wire thread, at the points of contact made by each thread section with the stud will radiate substantially from a common point on the axis of the stud as depicted in Fig. 4. As previously mentioned the difference in the coefficient of expansion of the two metals causes both the diameter and pitch of the groove in the aluminum to become correspondingly larger than the groove formed on the steel stud. By reason of the inherent elasticity of the wire spring thread it readily follows the aluminum boss in its expansion. Since the expansion movement of the aluminum radiates from a point on the axis of the stud the contact points between the steel stud and the wire thread sections move outwardly thereby slightly shifting the point of contact on the wire thread thus caring for the expansion difference between the stud and boss without causing an appreciable increase in stress to be set up in the grooves in the aluminum. When the parts are thus constructed the action which occurs during temperature expansion is that the wire spring seated more deeply in the groove in the aluminum boss follows the movement of the aluminum and a slight sliding action occurs at the points of contact of the wire thread and the crest of the grooves in the stud. This provision for a sliding movement permits a compensation to take place to accommodate the difference in expansion rates of the materials employed thus permitting the load on the screw to be carried under all temperatures by all the threads in the light alloy under strain.

The screw thread proper is formed of an accurately sized spring wire circular in cross section. It may be made from carbon steel, bronze, or stainless steel. In practice I have also used music wire which if desired may be plated. The diameter of the wire to be employed may be taken as equal to about ¾ of the pitch thread selected, the length being considered with reference to the screw thread proportions and the relative strength desired for the stud and nut materials. The spring, it will be noticed, provides a hard polished surface with ample bearing in contact with the light metal alloy and protects the latter permitting the stud to be assembled tightly without damaging the weaker metal. Another equally important factor is found in the fact that this hard surface prevents any possibility of seizure or freezing between the tightly fitted parts. At its outer end the spring is provided with a sharp laterally extending projection 6 which becomes embedded in the softer metal upon the insertion of the stud.

Figure 9:
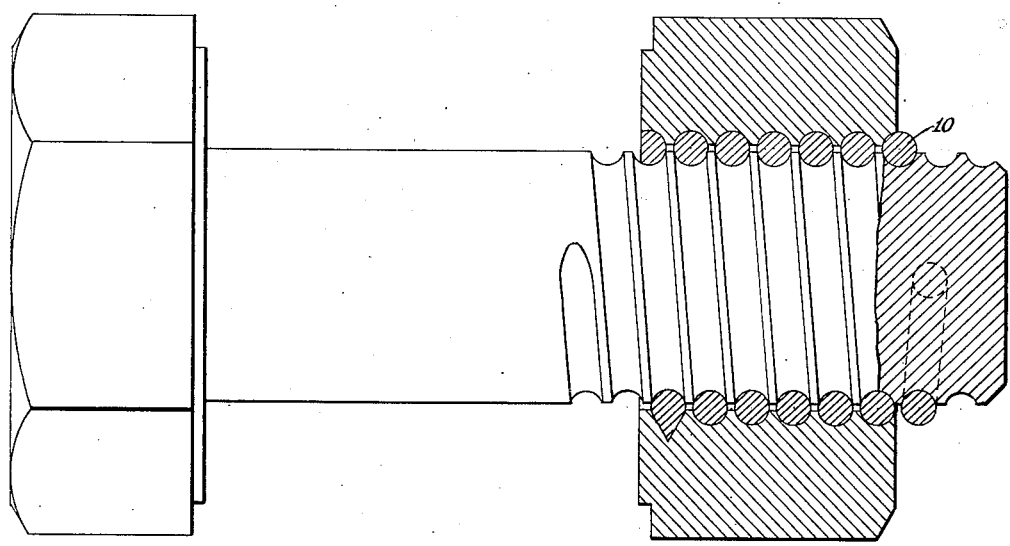
Fig. 9 is a cross-sectional view showing my invention applied to a bolt and nut both of which are made of aluminum alloy.

My invention is also particularly applicable to bolt and nut combinations where both elements are composed of light metal alloys such as aluminum. In Fig. 9, I have illustrated such parts and call attention to the fact that it is not necessary for the bolt to snugly fit the aperture in the nut. In fact it may be considerably smaller and yet the same strength obtained in the thread connection. The parts may be formed as explained in connection with Figs. 3 and 4, but as such parts are not usually subject to extreme temperature variations it is sufficient if the matching grooves in the nut and bolt are cut to receive something less than one-half of the cross-sectional diameter of the thread wire 10, for instance ⅜ of this diameter, thus leaving a clearance space between the parts of ¼ of the diameter of the wire. The diameter of the wire selected should be ¾ of the selected thread pitch and 10% to 15% of the diameter of the bolt. The hard wire between the aluminum alloy parts, irrespective of whether or not a clearance is provided, prevents seizure. By using the particular proportions of parts I have worked out a stronger screw or bolt, in any given size which can be developed and one that is particularly resistant to shock and impact loading because of the rounded bottom of the shallow groove formed in the male member.

Seizure, freezing or galling occurs from the rubbing together under heavy pressure of two metal surfaces and is particularly troublesome with certain alloys such as aluminum and stainless steel and may be entirely prevented by utilizing the disclosure herein since the hard, smooth polished spring wire thread serving as a separator reduces this tendency as it resists heavy pressure applied to the parts. When it is desired to protect the screw thread connection for aluminum parts against corrosive action I prefer to use as the connecting member a carbon steel spring wire and plate it with cadmium or zinc. When the mated members are of stainless steel I employ a hardened stainless steel spring wire.

I have found in practice that the hard spring wire screw thread as a connecting member possesses numerous advantages. It is recognized that the tensile strength of the usual form of screw threads is determined by the area at their root diameter. It will be seen from the illustrations that in practicing my invention the helical groove in the stud is comparatively shallow, in fact, it is of less depth than that of either of the series of standard coarse or fine screws as a result of which I am able to obtain a tensile strength of from 24% to 46% greater than the corresponding S. A. E. coarse thread screws and from 6% to 21% greater than that of the S. A. E. fine thread screws. Comparing actual stud strength, I have found that the ⅜ inch size, made as I have described, is approximately 33% stronger and the ½ inch size is approximately 29% stronger than that of the same size studs having S. A. E. standard coarse threads.

Under fatigue load or under impact load the advantage in strength of my improved thread has even higher values since the round engaging surfaces have considerably less of a notch effect than the sharp cornered V type, or American standard form of thread. Another advantage to be mentioned is found in the side support afforded when the stud is intended to function as a dowel. In other forms of threads a load carried by the stud at right angles to its axis causes a wedging action of the threads whereas with the parts constructed in accordance with my invention these loads are readily taken on the inside contact surface between the round wire and the groove which enables the stud to take considerable side or shear load without requiring the added weight and expanse of a straight dowel section as heretofore required.

Where a steel stud or screw is used in an aluminum or light alloy member, the hard wire thread is always maintained by its spring action against the internally threaded surface of the nut or boss. Any radial looseness that exists between the screw and the boss must therefore exist between the hard materials of the steel screw and the wire screw thread. Battering or pick-up between these hard materials is not as likely to occur under varying side loads as between a steel screw bearing directly in an aluminum boss. Radial looseness between steel screws engaging in light alloy members can not generally be entirely eliminated, especially under conditions of varying loads and temperatures. The wire spring screw thread is therefore particularly suitable in aluminum or light alloy members for use with steel screws or studs that are employed as dowel members or are subjected to varying side or shear loads.

Still another advantage I have obtained resides in lessening the cost of production. With the tight thread fit that is generally essential in the light alloys, any roughness, distortion, or blemish on the older standard form of thread cut on the stud is liable to seriously damage or strip the internal thread in the light alloy part on assembly. It is therefore necessary when a steel stud with the older form of standard thread is made for assembly into aluminum, to carefully cut the thread on the steel stud after heat treatment, to hold the size and thread form to very close limits, and to painstakingly remove all burrs and sharp edges. When the hard, high strength stud steels are employed, this usually requires the finishing of these threads on a thread-milling machine or on a thread grinder, and such methods of manufacture are relatively slow and expensive. With the wire spring screw thread there is no fear of damaging the threads in the light alloy boss during assembly, so that some groove roughness and distortion as well as greater tolerances in the finished size can be permitted. The grooves can therefore be cut or formed before heat treatment by any of the more rapid thread-forming operations. Furthermore, the shallow rounded thread groove in the stud practically eliminates the possibility of serious heat treatment strains in the grooves of those studs that must be heat treated to obtain greater strengths and higher degrees of hardness.

My wire spring screw thread simplifies the servicing and replacement of studs when used in aluminum or other light alloy parts. Experience has shown that when it is necessary to replace in aluminum a stud which employs the older standard type of thread, a stud with the thread of a slightly larger size than that of the original stud must be used in order to obtain the proper tight fit. This necessitates keeping in stock studs with threads of varying amounts of oversize, and it makes the proper replacement of such studs an operation that requires particular skill and training. With my invention no enlarging of the threads in the light alloy boss results in service, nor is the thread in the aluminum damaged when assembling or removing a stud, consequently stud replacements can always be made by using studs with grooves of the standard size, and no particular skill or care is required when making these replacements. This fact alone recommends the invention for use in military aircraft engines and similar devices where the simplification of the service problem with reference to studs is particularly desirable.

I have referred herein to the use of a stud and its attachment to a boss for convenience in description, but it will be understood that these terms are illustrative and that the invention is applicable to a great variety of uses where two light alloy parts are to be detachably connected such as bolts and nuts, cap nuts, shaft collars and pipe fittings. In some instances it may be desired to provide means for locking the connected parts and in such cases the spring wire thread may be provided with a tail portion 6ª (Fig. 8) which may be bent or forced laterally as shown in dotted lines into a notch or recess in the end of the stud after the latter has been seated.

What is claimed is:

1. The method of attaching to a metal female member a metal stud member of harder material consisting in cutting matching helical grooves in each with the adjacent convolutions spaced apart, the groove in the female member being deeper than that in the stud member, inserting in the groove of the female member a spring wire of a cross-section so shaped as to completely fill the cross-section of the groove in the female member and to engage the groove of the stud member, said wire being coiled in a spiral of outer diameter exceeding the major diameter of the groove in the female member, whereby the wire springs into the groove in the female member when inserted, and screwing said stud into said wire spiral.

2. The method of attaching to a metal female member a metal stud member of harder material consisting in cutting matching helical grooves in each part with the adjacent convolutions spaced apart, said grooves having cross-sections shaped as segments of equal diameter, and the groove of said female member being deeper than that of the stud member, inserting in the groove of said female member a hard polished spring wire of circular cross-section of a diameter equal to that of said segments, said wire being coiled in a spiral of an outer diameter exceeding the major diameter of the groove in the female member, whereby the wire springs into the groove in the female member when inserted, and screwing said stud into said wire spiral.

3. The method of attaching to a female member of an aluminum alloy a stud member of harder metal consisting in providing them with corresponding arcuate helical grooves which when mated have a circular cross-section, the diameter of which is approximately equal to ¾ of the pitch of the helix, the portion of the groove in the male member being of a depth approximately equal to ⅜ of the diameter of the circular cross-section of the thread grooves, and connecting the two members with a helical wire circular in cross-section and having a diameter equal to said groove diameter, said wire helix originally having an outer diameter exceeding the major diameter of the groove in the female member whereby the wire springs into the groove in the female member when inserted in the latter.

4. The method of attaching to a metal female member a metal stud member having a lower co-efficient of expansion, consisting in cutting in said female member a helical groove of constant depth with the adjacent convolutions spaced apart, providing said stud member with a slight taper and with a helical groove thereon matching the groove of said female member, the groove of said stud member having cross-sections shaped as segments of equal diameter but of depths decreasing towards the tapering end of the stud, inserting in the groove of the female member a spring wire of a cross-section so shaped as to completely fill the cross-section of the groove in the female member and to engage the groove of the stud member, said wire being coiled in a spiral of an outer diameter exceeding the major diameter of the groove in the female member, whereby the wire springs into the groove in the female member when inserted, and screwing said stud into said wire spiral.

HAROLD CAMINEZ.